United States Patent [19]

Toyoda et al.

[11] Patent Number: 5,888,302
[45] Date of Patent: Mar. 30, 1999

[54] SUCTION SYSTEM FOR USE IN A METHOD OF LINING THE INTERNAL SURFACE OF A PIPE

[75] Inventors: Shigeru Toyoda, Saitama-ken; Shuichi Yagi; Masaaki Itagaki, both of Kanagawa-ken, all of Japan

[73] Assignee: Tokyo Gas Co. Ltd., Tokyo, Japan

[21] Appl. No.: 560,926

[22] Filed: Nov. 20, 1995

[30] Foreign Application Priority Data

Nov. 28, 1994 [JP] Japan .................................. 6-293496
Nov. 28, 1994 [JP] Japan .................................. 6-293497
Nov. 28, 1994 [JP] Japan .................................. 6-293498

[51] Int. Cl.[6] .................................................. B05C 7/00
[52] U.S. Cl. ........................... 118/684; 118/712; 118/50; 118/603; 118/610; 118/DIG. 10; 425/11; 425/13; 425/169; 425/171
[58] Field of Search ................................... 118/684, 712, 118/50, 603, 610, 300, 306, 408, DIG. 10; 427/238, 239; 264/36, 101; 425/11, 13, 169, 171; 156/287, 294; 138/97, 98; 134/169 C; 285/45, 55

[56] References Cited

U.S. PATENT DOCUMENTS

| 4,370,364 | 1/1983 | Boer ........................................ 427/238 |
| 4,504,204 | 3/1985 | Koga ......................................... 425/11 |
| 4,556,580 | 12/1985 | Kamaro et al. ......................... 427/238 |
| 4,849,026 | 7/1989 | Steinhaus ............................. 134/22.12 |
| 5,293,905 | 3/1994 | Friedrich ................................... 138/89 |
| 5,368,809 | 11/1994 | Steketee, Jr. ............................ 264/516 |

Primary Examiner—Laura Edwards
Attorney, Agent, or Firm—Nikaido, Marmelstein, Murray & Oram LLP

[57] ABSTRACT

There is provided a suction system for use in a method of lining the internal surface of a pipe, said suction system comprises a pig receiving device to be attached to an open end of the pipe, a liquid receiving tank connected with the pig receiving device, and a suction pump connected with the liquid receiving tank. Further, a pig detecting device for detecting the passing of a pig is provided between the open end of the pipe and the pig receiving device, a suction force controlling device is provided between the pig receiving device and the liquid receiving tank, and a gas-liquid separation apparatus is provided between the liquid receiving tank and the suction pump.

10 Claims, 11 Drawing Sheets

FIG.8
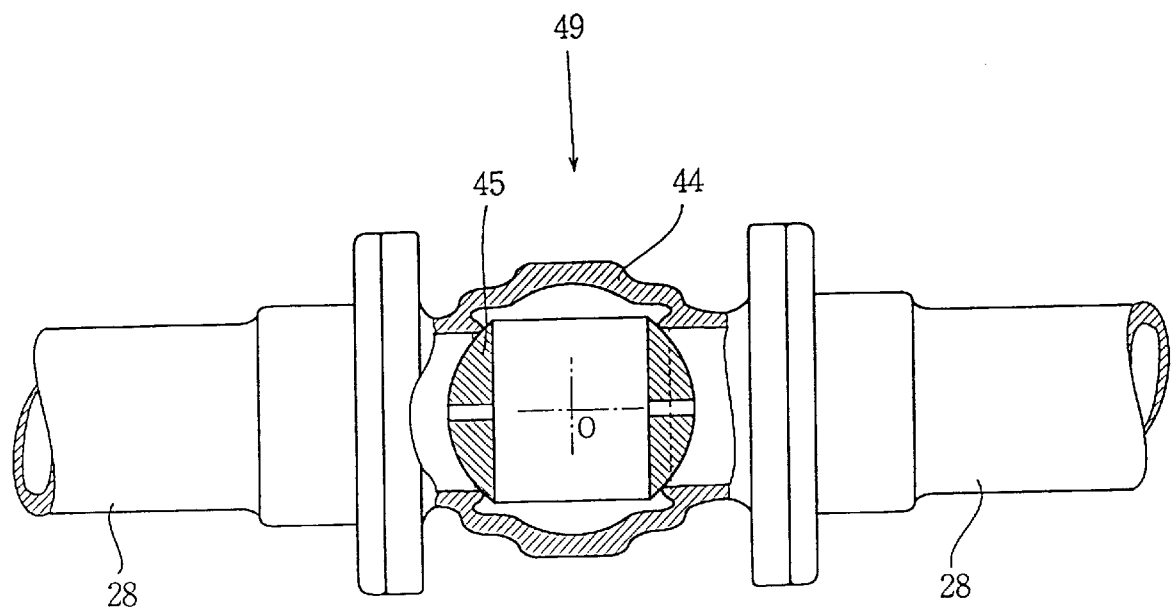
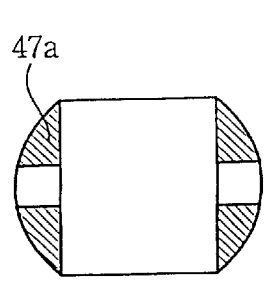 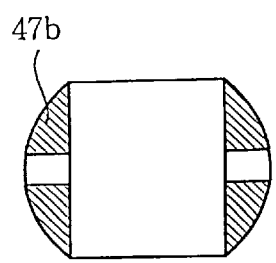 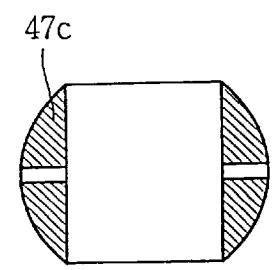

SUCTION SYSTEM FOR USE IN A METHOD OF LINING THE INTERNAL SURFACE OF A PIPE

BACKGROUND OF THE INVENTION

The present invention relates to a suction system, in particular to a suction system for use in a method of lining the internal surface of an existing pipe buried under ground.

There has been known a no-excavation underground pipe lining method in which the internal surface of an existing underground gas pipe, water pipe, etc. are lined with a resin without the necessity of any trenching or excavation.

Usually, a gas service pipe is buried under ground branching from a gas main and extending to a user's house. In the method called no-excavation underground pipe lining, there are substantially two steps involved. In the first step, an injection system is employed to produce a pressurized liquid to introduce a necessary amount of resin into the service pipe through an open end thereof and to move the resin through the pipe until the front end of the resin plug flow reaches an inner end (a position branching from a gas main) of the pipe. In the second step, a suction system is employed to produce a suction force to suck back the liquid injected in the pipe so as to cause the resin to move back from the inner end to line the internal surface of the pipe with the resin.

A conventional suction system for use in the above-described method, usually includes (a) a pig receiving device to be attached to an open end of the pipe for receiving from the pipe various pigs used in lining treatment, (b) a liquid receiving tank connected with the pig receiving device for receiving liquid flowing back from the pipe, (c) a suction pump connected with the liquid receiving tank for producing a suction force on the liquid, various pigs and resin introduced in the pipe, to cause a backward movement of the resin so as to line the internal surface of the pipe with the back-moving resin.

However, with the use of the conventional suction system as described above, it is difficult to confirm whether the pigs introduced in the pipe and used in the lining treatment have returned or not. In particular, since it is not easy to confirm whether all the used pigs have been recovered or not, it is difficult to stop the operation of the suction pump even if the last pig has been recovered in the pig receiving device. As a result, the suction pump is often stopped too late, so that there will be too much of a gas to be sucked out of the pipe, resulting a waste of the gas.

Further, with the use of the conventional suction system as described above, it is difficult to control the suction force, resulting a problem that the in situ lining speed can not be controlled, hence it is almost impossible to obtain a resin lining layer having a desired thickness Moreover, with the use of the conventional suction system as described above, it is difficult to prevent liquid drops from entering the suction pump, resulting in damage to the suction pump.

SUMMARY OF THE INVENTION

An object of the present invention is to provide an improved suction system for pipe lining treatment, capable of detecting the passing of a pig so as to stop the operation of a suction pump upon the returning of the last pig and thus avoid a waste of a gas.

Another object of the present invention is to provide an improved suction system for pipe lining treatment, capable of controlling a suction force so as to control in situ lining speed and thus obtaining a resin lining layer having a desired thickness.

A further object of the present invention is to provide an improved suction system for pipe lining treatment, capable of preventing liquid drops from entering a suction pump so as to protect the suction pump from damage.

According to a first aspect of the present invention, there is provided a suction system for use in a method of lining the internal surface of a pipe, said suction system comprises a pig receiving device to be attached to an open end of the pipe for receiving from the pipe various pigs used in lining treatment, a liquid receiving tank connected with the pig receiving device for receiving liquid flowing back from the pipe, and a suction pump connected with the liquid receiving tank for producing a suction force on the liquid, various pigs and resin introduced in the pipe, to cause the resin to move back from an inner end of the pipe so as to line the internal surface of the pipe with the back-moving resin. Between the open end of the pipe and the pig receiving device is provided a pig detecting device for detecting the passing of a pig returning from the pipe and for giving an alarm signal upon detecting a pig passing.

According to a second aspect of the present invention, there is provided a suction system for use in a method of lining the internal surface of a pipe, said suction system comprises a pig receiving device to be attached to an open end of the pipe for receiving from the pipe various pigs used in lining treatment, a liquid receiving tank connected with the pig receiving device for receiving liquid flowing back from the pipe, and a suction pump connected with the liquid receiving tank for producing a suction force on the liquid, various pigs and resin introduced in the pipe, to cause the resin to move back from an inner end of the pipe so as to line the internal surface of the pipe with the back-moving resin. Between the pig receiving device and the liquid receiving tank is provided a suction force controlling device for controlling a suction force caused by the suction pump so as to control a resin lining speed.

According to a third aspect of the present invention, there is provided a suction system for use in a method of lining the internal surface of a pipe, said suction system comprises a pig receiving device to be attached to an open end of the pipe for receiving from the pipe various pigs used in lining treatment, a liquid receiving tank connected with the pig receiving device for receiving liquid flowing back from the pipe, and a suction pump connected with the liquid receiving tank for producing a suction force on the liquid, various pigs and resin introduced in the pipe, to cause the resin to move back from an inner end of the pipe so as to line the internal surface of the pipe with the back-moving resin. Between the liquid receiving tank and the suction pump is provided a gas-liquid separation apparatus which allows the passing of a gas but absorbs a liquid so that the liquid component is prevented from entering the suction pump.

According to a fourth aspect of the present invention, there is provided a suction system for use in a method of lining the internal surface of a pipe, said suction system comprises a pig receiving device to be attached to an open end of the pipe for receiving from the pipe various pigs used in lining treatment, a liquid receiving tank connected with the pig receiving device for receiving liquid flowing back from the pipe, and a suction pump connected with the liquid receiving tank for producing a suction force on the liquid, various pigs and resin introduced in the pipe, to cause the resin to move back from an inner end of the pipe so as to line the internal surface of the pipe with the back-moving resin. Between the open end of the pipe and the pig receiving device is provided a pig detecting device for detecting the passing of a pig returning from the pipe and for giving an alarm signal upon detecting a pig passing. Between the pig receiving device and the liquid receiving tank is provided a suction force controlling device for controlling a suction force caused by the suction pump so as to control a resin lining speed. Between the liquid receiving tank and the suction pump is provided a gas-liquid separation apparatus which allows the passing of a gas but absorbs a liquid so that the liquid component is prevented from entering the suction pump.

The above objects and features of the present invention will become more understood from the following description with reference to the accompanying drawings.

BRIEF DESCRIPTION OF DRAWINGS

FIG. 8 is an enlarged view illustrating another suction force controlling device, for use in the second step of the method for lining the internal surface of an underground pipe.

DETAILED DESCRIPTION OF THE PREFERRED EMBODIMENTS

Figure 1:
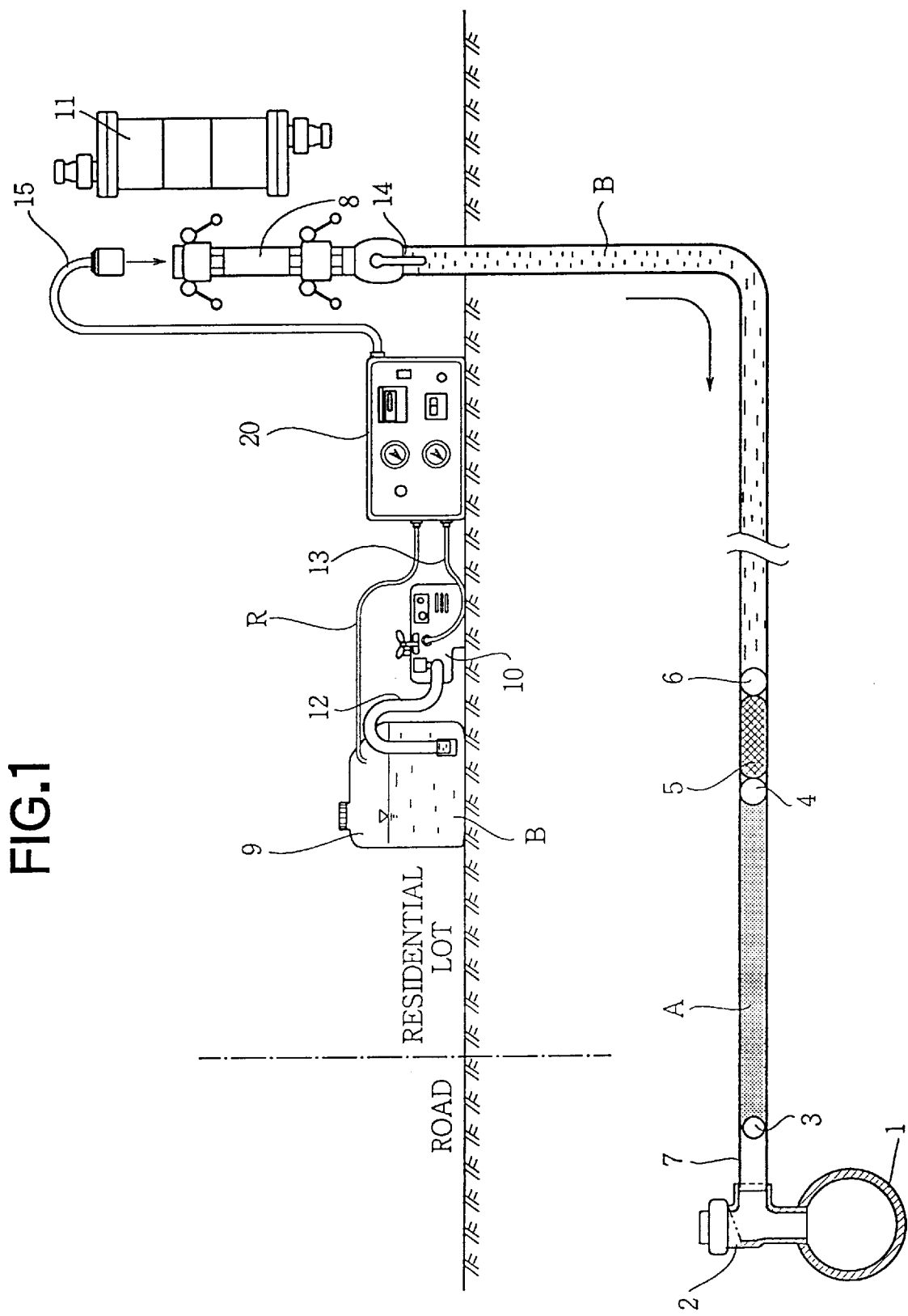
FIG. 1 is an explanatory view illustrating an injection system for use in the first step of the method for lining the internal surface of an underground pipe.

Referring to FIG. 1 illustrating an injection system for use in the first step of the method for lining the internal surface of an underground pipe, an existing gas service pipe 7 is buried under ground branching from a gas main 1 and extending to a user's house. Close to an open end 14 of the gas service pipe 7 are disposed a liquid injection controlling device 20, a liquid pump 10 and liquid tank 9, connected in series toward pipeline by means of several hoses 12, 13 and 15. In the drawing, a hose R is used to allow an extra liquid to flow back to the liquid tank 9 if the pressure of a liquid being supplied through the liquid pump 10 exceeds a predetermined value.

In operation, a lining pig 3 is inserted in the pipe 7 through its open end 14. Then, operating the liquid pump 10 and using a resin injection device 11, a necessary amount of resin A for lining the internal surface of the pipe is introduced into the pipe 7 by a force of a pressurized liquid (such as water) being pumped from the liquid tank 9. Afterwards, a resin transporting pig 4, a liquid absorbing material 5 and a liquid blocking pig 6 are introduced into the pipe by the force of the same pressurized liquid, with the use of a pig cassette 8. Subsequently, by continually operating the pump 10, a necessary amount of liquid B is pumped from the liquid tank 9, to flow through the liquid injection controlling device 20 into the pipe 7. In this way, the resin A is moved forward through the pipe 7 until the front end of the resin plug flow A reaches an inner end 2 (a position branching from the gas main 1) of the pipe 7.

Figure 2:
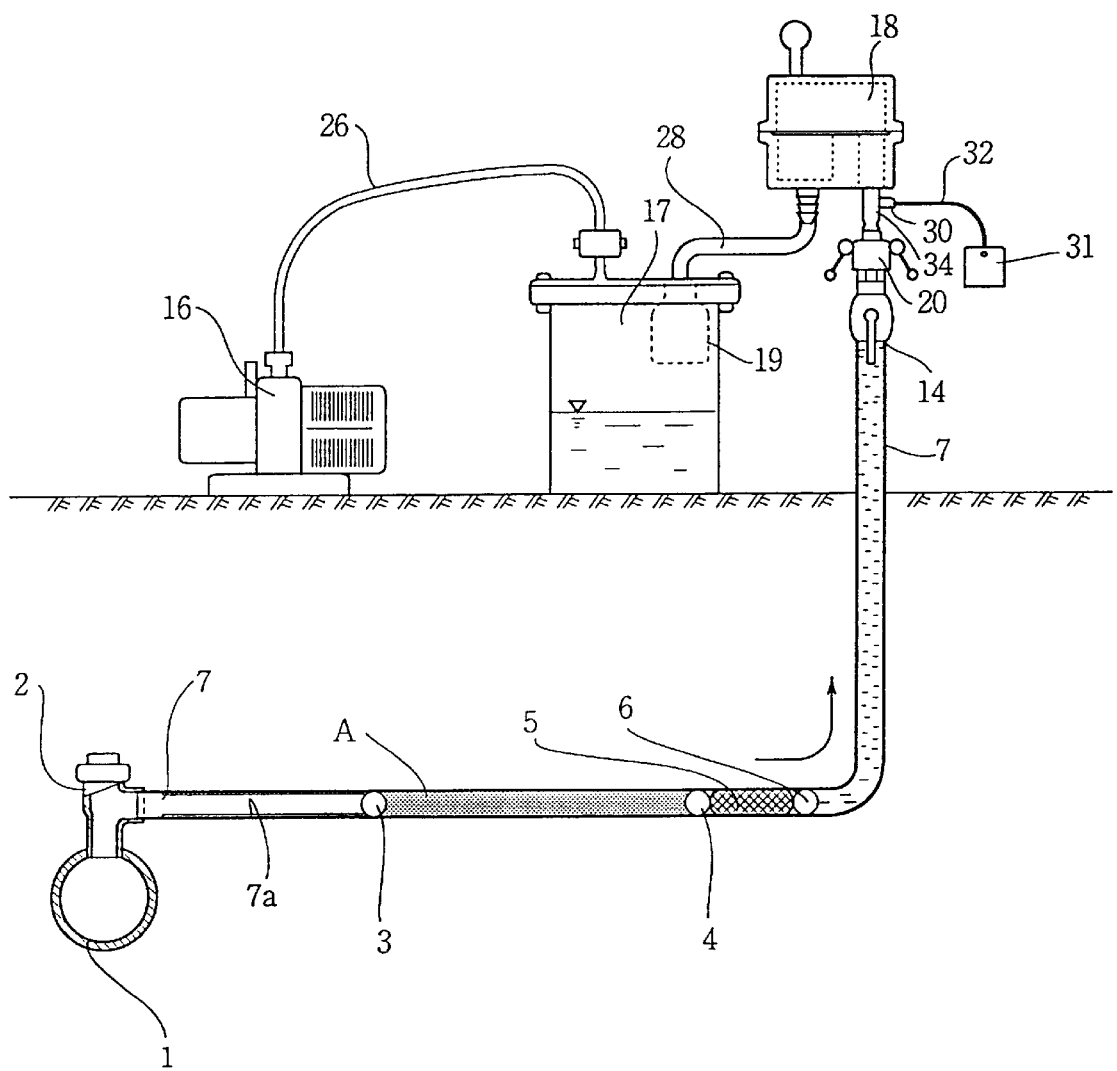
FIG. 2 is an explanatory view illustrating a suction system improved according to the first aspect of the present invention, for use in the second step of the method for lining the internal surface of an underground pipe.

FIG. 2 is an explanatory view illustrating a suction system improved according to the first aspect of the present invention, for use in the second step of the method for lining the internal surface of an underground pipe. Referring to FIG. 2, a pig receiving device 18 is attached through a connecting mechanism 20 to the open end 14 of the pipe 7 to receive various pigs returning from the pipe 7. A liquid receiving tank 17 is connected through a hose 28 with the pig receiving device 18 to recover liquid B flowing back from the pipe 7. A resin separating means 19, which allows the passing of liquid but stops the resin mixed in the liquid, is provided within the tank 17. A suction pump 16 is connected with the liquid receiving tank 17 through a hose 26. Further, between the open end 14 of the pipe 7 and the pig receiving device 18 is provided a pig detecting device (30, 31, 32) for detecting the passing of a pig returning from the pipe 7 and for giving an alarm signal upon detecting a pig passing.

Figure 3:
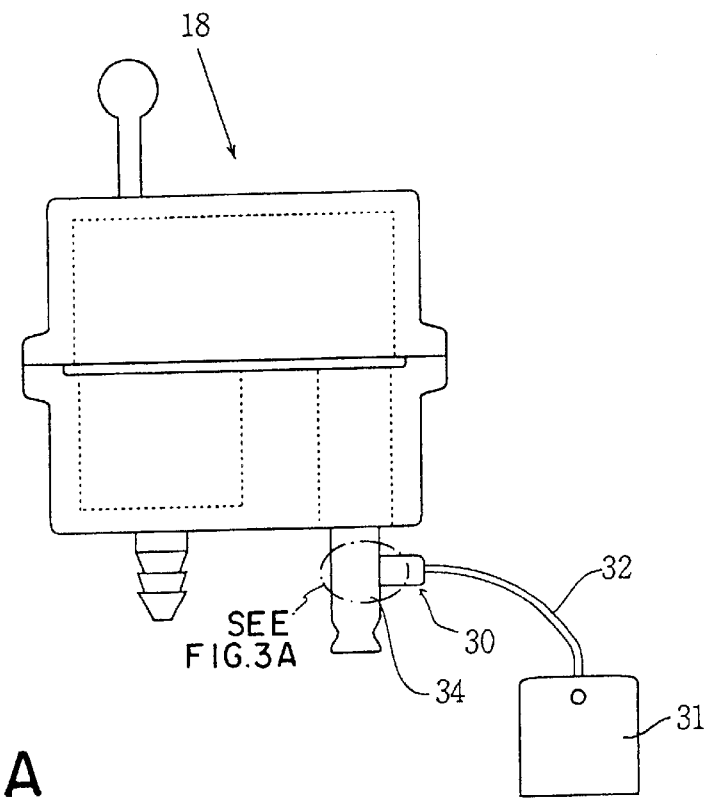
FIG. 3 is an enlarged view illustrating a pig detecting device for use in the suction system of FIG. 2.
Figure 3A:
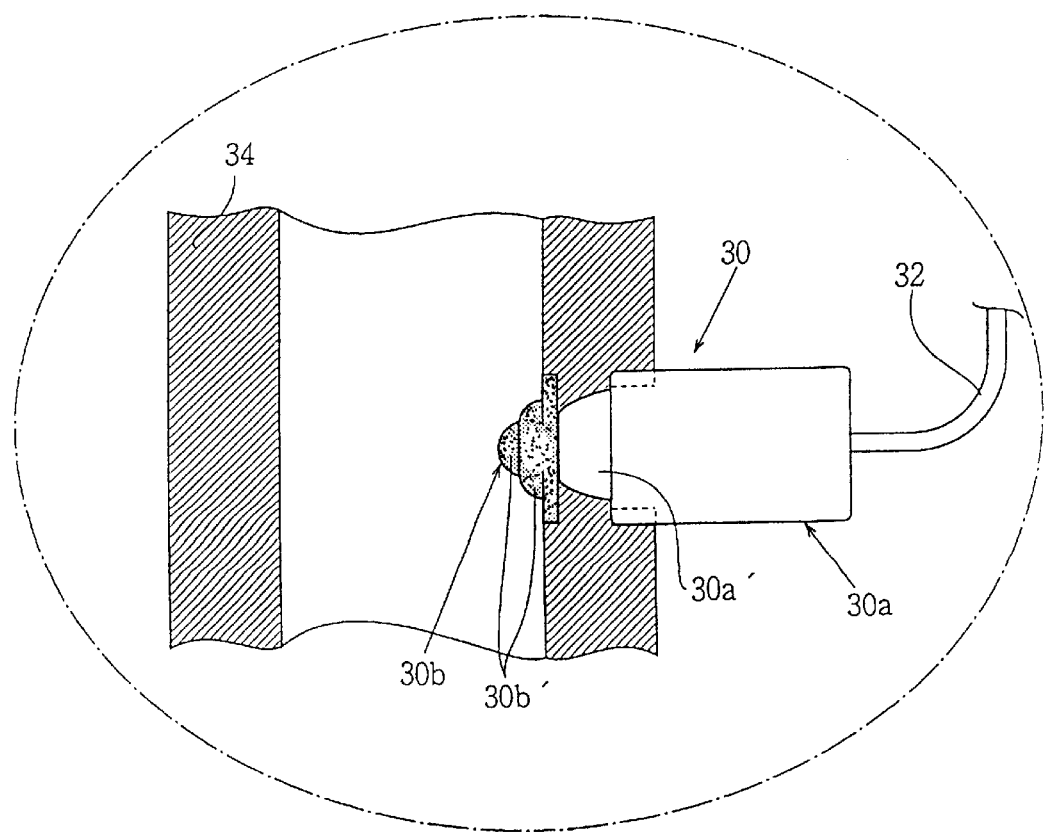
FIG. 3A is a further enlarged view of a circled part of FIG. 3.

Referring to FIG. 3, the pig detecting device (30, 31, 32) comprises a detecting section 30 for detecting the passing of a pig, an alarm means 31 for giving an alarm signal, and a cord 32 for connecting the detecting section 30 to the alarm means 31. The detecting section 30 includes a detecting switch 30a having a push button 30a', and an reversible rubber contact member 30b having an reversible operating portion 30b'. The reversible rubber contact member 30b is positioned such that the push button 30a' of the detecting switch 30a is covered by the reversible operating portion 30b' of the reversible rubber contact member 30b. The alarm means 31 connected with the detecting switch 30a is a conventional buzzer or a counter which give an alarm signal when the passing of a pig is detected by the detecting section 30.

In particular as shown in FIG. 3, the detecting section 30 is secured through the wall of a pipe-like joint member 34 which is used to connect the pig receiving device 18 to the open end 14 of the pipe 7, by means of the connecting mechanism 20.

It is understood from FIG. 3 that, if there is no pig passing through the pipe-like joint member 34, the reversible operating portion 30b' of the reversible rubber contact member 30b is projecting from the inner wall of the member 34, as indicated in an enlarged part of FIG. 3. Then, referring to FIG. 4, if a pig such as a resin transporting pig 4 is returning from the pipe 7 and passing through the pipe-like joint member 34, the reversible operating portion 30b' of the reversible rubber contact member 30b is pushed in an opposite direction so that the portion 30b' is reversed to push the push button 30a' of the detecting switch 30a. Therefore, the alarm means 31 gives an alarm signal to indicate the passing of a pig.

Figure 4:
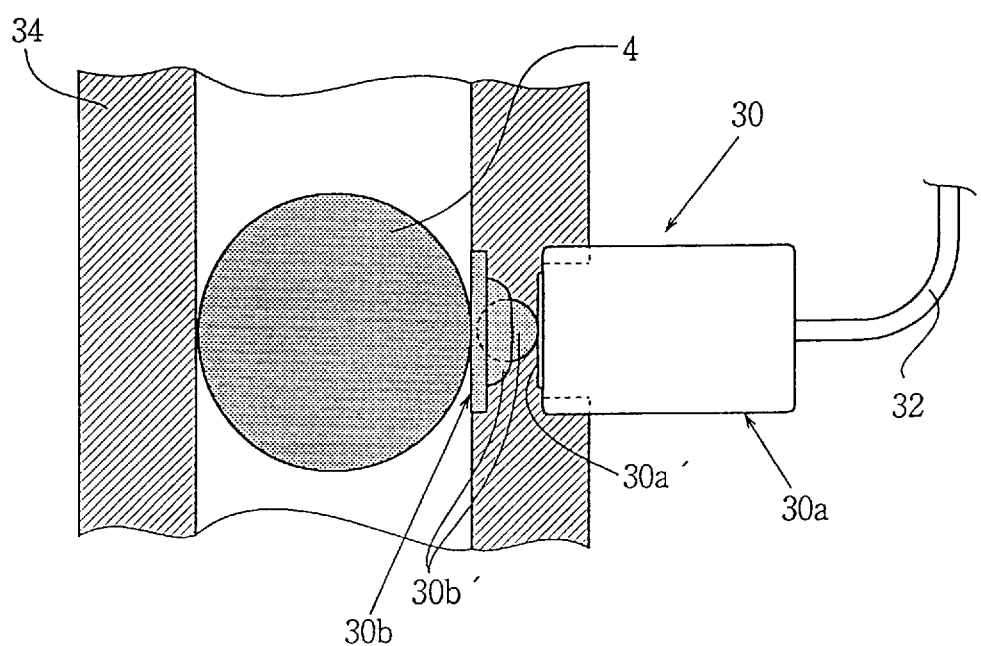
FIG. 4 is an enlarged view illustrating the pig detecting device when detecting the passing of a pig.

Since the reversible rubber contact member 30b is specifically made such that the its reversible operating portion 30b' can constantly project from the inner wall of the joint member 34, the reversible operating portion 30b' can automatically return from a condition shown in FIG. 4 to a condition shown in FIG. 3 as soon as a pig leaves therefrom. In this way, the detecting section 30 can serve to detect another pig passing therethrough, and the number of the pigs passed can be counted.

After the last pig (such as the lining pig 3) has been detected in the same manner, it can be determined that all the pigs have returned from the pipe 7 and been received in the pig receiving device 18. Therefore, it is possible to stop the operation of the suction pump 16 soon after the last pig 3 is detected, so that a possible waste of a gas due to over sucking is exactly prevented.

In suction operation, by operating the suction pump 16, the liquid B is sucked back from inside the pipe 7, so that the liquid blocking pig 6, liquid absorbing material 5, resin transporting pig 4, resin A and lining pig 3 are all moved backwardly. As illustrated in FIG. 2, while the resin plug flow A is being moved back, a resin layer 7a is formed on the internal surface of the pipe 7.

During this suction process, liquid B is received in the liquid receiving tank 17, whilst the pigs are caused to pass through the pipe-like joint member 34, detected by the pig detecting section 30, and received in the pig receiving device 18. The operation of the suction pump 16 is stopped upon detecting the passing of the last pig, thereby avoiding a possible waste of a gas.

Figure 5:
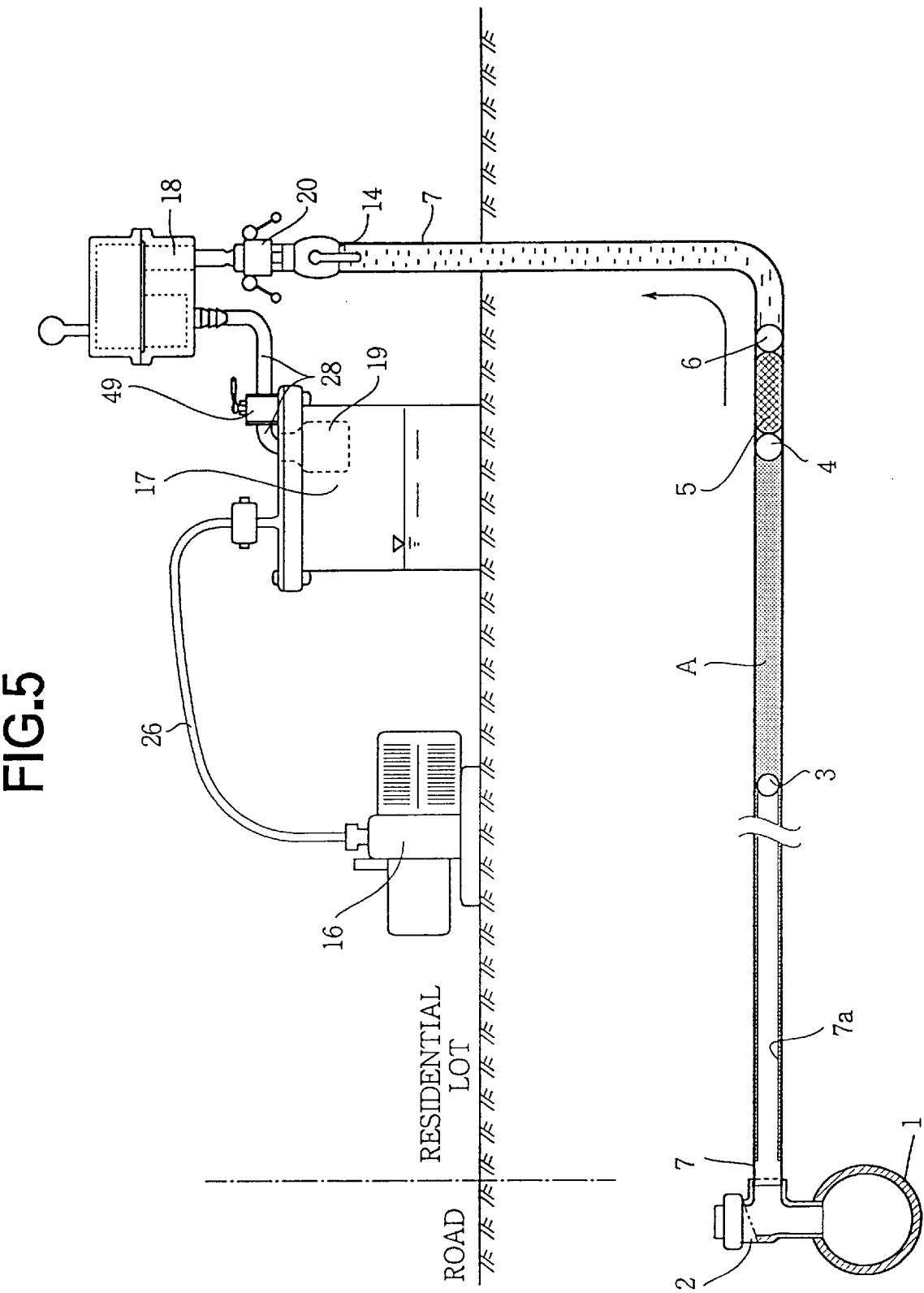
FIG. 5 is an explanatory view illustrating a suction system improved according to the second aspect of the present invention, for use in the second step of the method for lining the internal surface of an underground pipe.

FIG. 5 is an explanatory view illustrating a suction system improved according to the second aspect of the present invention, for use in the second step of the method for lining the internal surface of an underground pipe. Referring to FIG. 5, most of the equipments used are the same as in the suction system described above, i.e., the pig receiving device 18 is attached through the connecting mechanism 20 to the open end 14 of the pipe 7 to receive various pigs returning from the pipe 7. The liquid receiving tank 17 is connected through the hose 28 with the pig receiving device 18 to recover liquid B flowing back from the pipe 7. A resin separating means 19, which allows the passing of liquid but stops the resin mixed in the liquid, is provided within the tank 17. The suction pump 16 is connected with the tank 17 through the hose 26. Further, a suction force controlling device 49 is connected between the pig receiving device 18 and the liquid receiving tank 17, by way of the hose 28.

Figure 6:
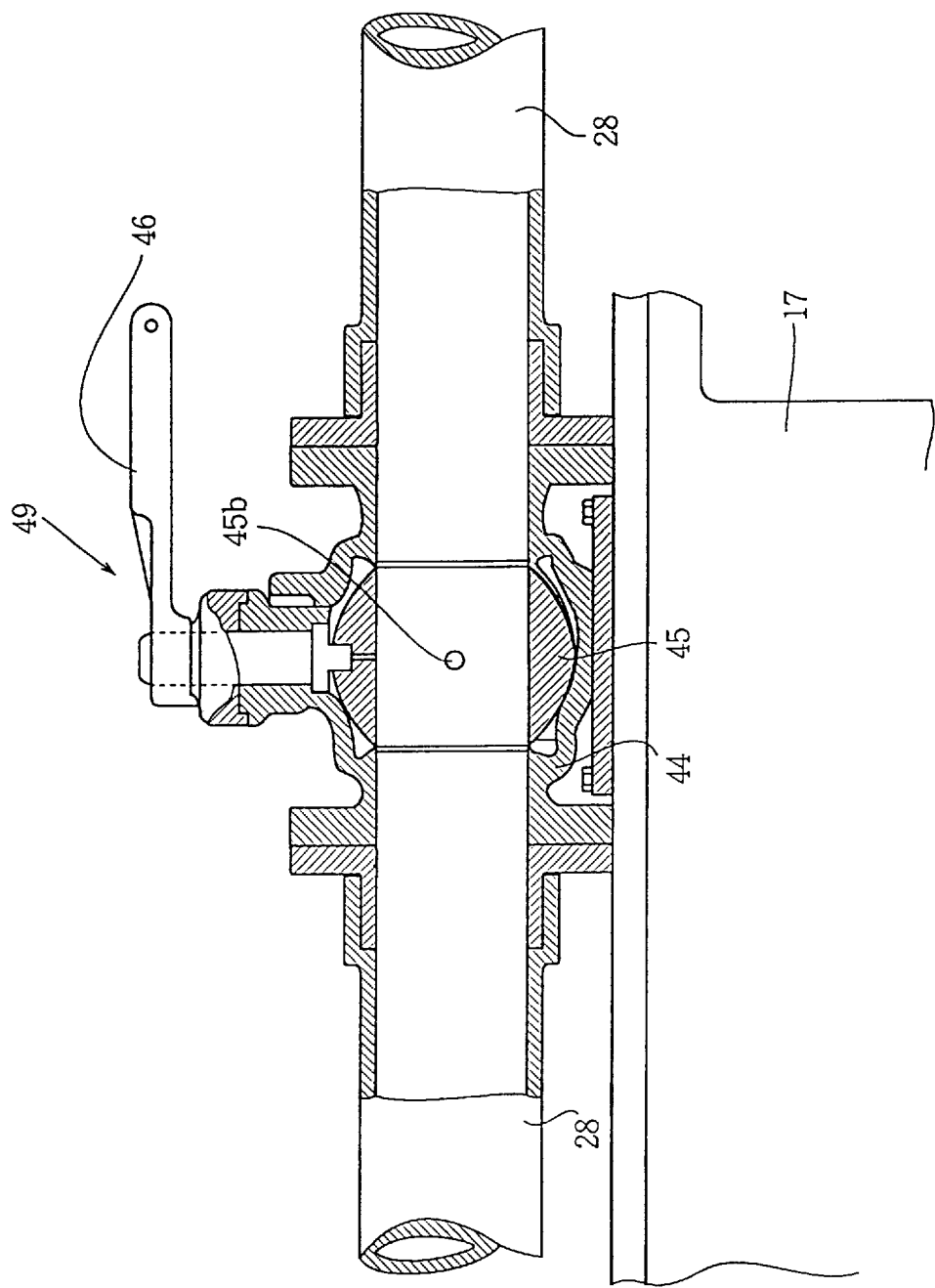
FIG. 6 is an enlarged view illustrating a suction force controlling device for use in the suction system of FIG. 5.

Referring to FIG. 6, the suction force controlling device 49 is formed as a ball valve mounted on the top of the liquid receiving tank 17. Such suction force controlling device 49 comprises a casing 44, a ball-like valve member 45 located within the casing 44, an operating handle 46 for opening or closing the device.

Figure 7:
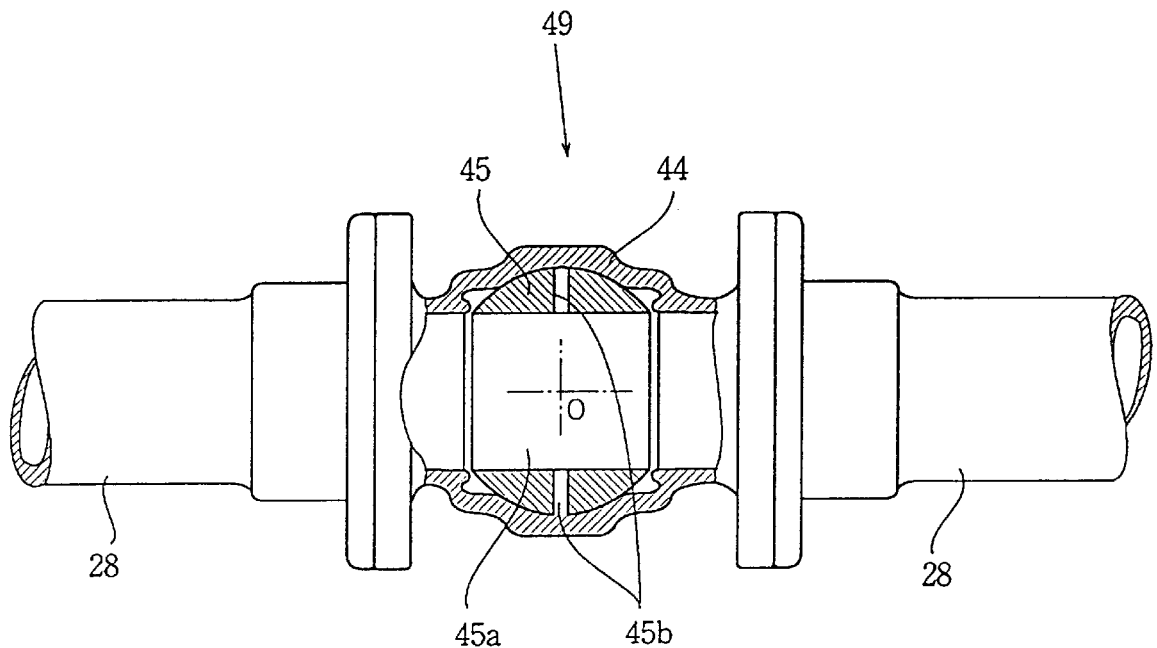
FIGS. 7(a) and 7(b) are enlarged views illustrating the suction force controlling device of FIG. 6 in its opened and closed positions.
Figure 7:
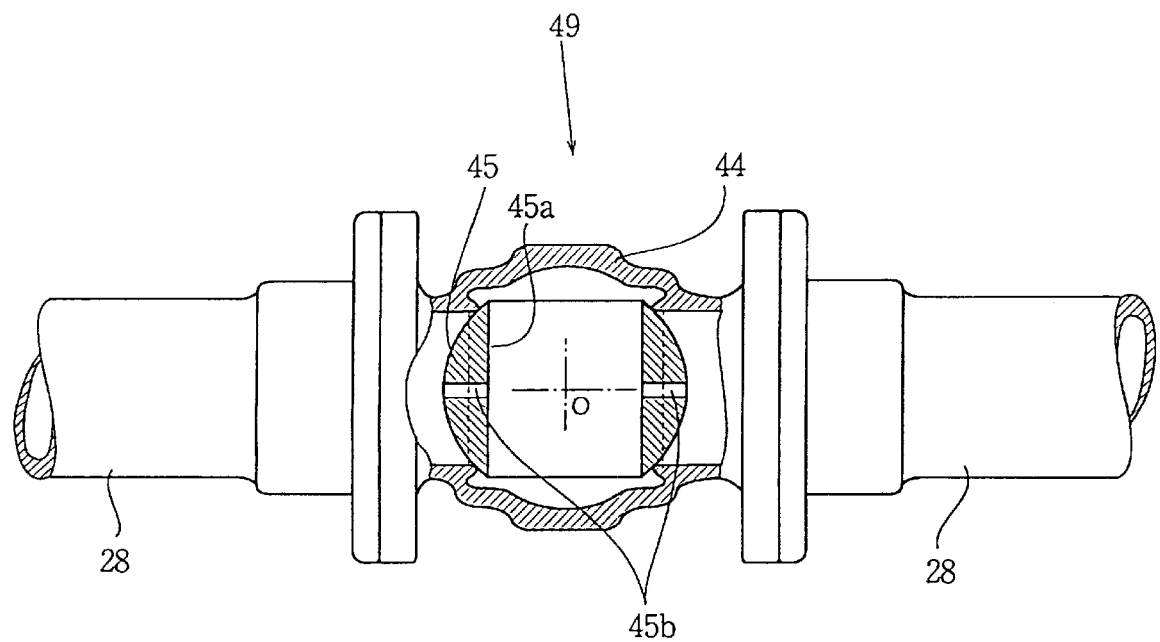

Referring to FIG. 7(a), the ball-like valve member 45 is formed as having a hollow central portion 45a. Then the suction force controlling device 49 is in a position as shown in FIG. 7(a), the device 49 is opened so that the upstream and downstream thereof are communicated with each other. By operating another operating handle (not shown), the device 49 may be closed by turning the ball-like valve member 45 for 90° in vertical direction, hence the device 49 becomes into a position as shown in FIG. 7(b). After the device 49 has changed into a position of FIG. 7(b), by means of a pair of orifice holes 45b formed in the opposite portions of the valve member 45, the upstream and downstream ends of the device 49 can still be kept in a communicated condition to some extent.

Referring again to FIG. 6, by turning the handle 46 for 90° in the horizontal direction, the suction force controlling device 49 may also be closed into a position as shown in FIG. 7(b).

In addition, as illustrated in FIG. 8, the orifice holes of the device 49 are changeable in their cross section by providing several ball-like valve members 47a, 47b and 47c which have orifice holes of different diameters and changing these valve members in the device 49. Therefore, a ball-like valve member having orifice holes of an appropriate diameter may be easily selected from the valve members 47a, 47b and 47c in accordance with a desired suction force and a required resin lining speed.

In this way, in the second step of the pipe lining method, since two or more kinds of suction forces may be obtained simply by operating either of two operating handles of the suction force controlling device 49 or by changing orifice members 47 in the device 49, it is possible to obtain two or more kinds of speeds for a fluid flowing in the suction system, thereby effectively controlling the resin lining speed in the pipe 7 so as to form on the pipe internal surface a resin lining layer 7a having a desired thickness.

Therefore, by operating the suction pump 16, the liquid B may be sucked back from inside the pipe 7 in a properly controlled speed, so that the liquid blocking pig 6, liquid absorbing material 5, resin transporting pig 4, resin A and lining pig 3 are all moved backwardly in the similarly controlled speed. As illustrated in FIG. 5, while the resin plug flow A is being moved back in a controlled speed, a resin layer 7a having a desired thickness is thus formed on the internal surface of the pipe 7.

Figure 9:
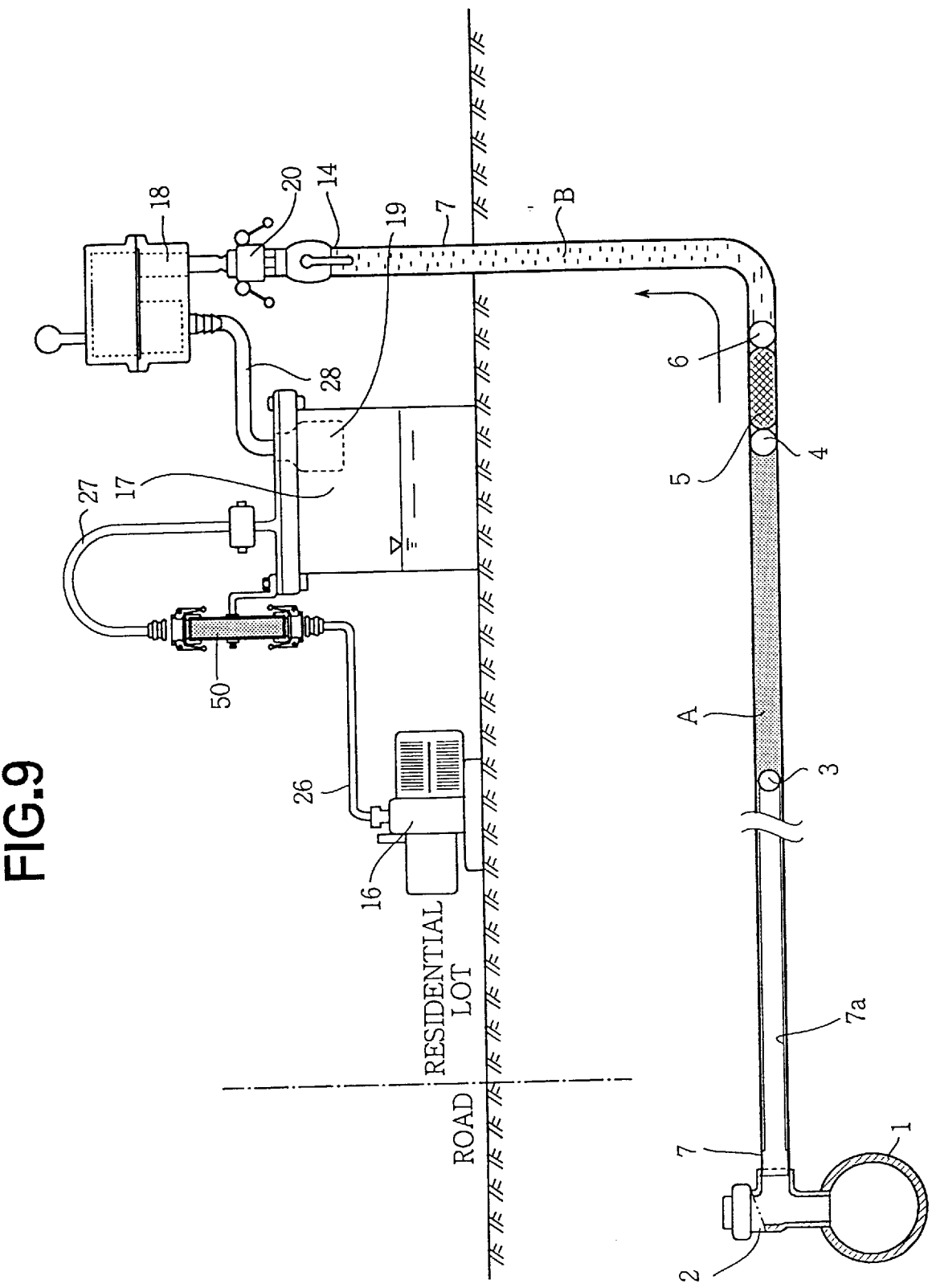
FIG. 9 is an explanatory view illustrating a suction system improved according to the third aspect of the present invention, for use in the second step of the method for lining the internal surface of an underground pipe.

FIG. 9 is an explanatory view illustrating a suction system improved according to the third aspect of the present invention, for use in the second step of the method for lining the internal surface of an underground pipe. Referring to FIG. 9, most of the equipments used are the same as in the suction systems described above, i.e., the pig receiving device 18 is attached through the connecting mechanism 20 to the open end 14 of the pipe 7 to receive various pigs returning from the pipe 7. The liquid receiving tank 17 is connected through the hose 28 with the pig receiving device 18 to recover liquid B flowing back from the pipe 7. A resin separating means 19, which allows the passing of liquid but stops the resin mixed in the liquid, is provided within the tank 17. The suction pump 16 is connected with the liquid receiving tank 17 through the hose 26. Further, a gas-liquid separation apparatus 50 is connected between the liquid receiving tank 17 and the suction pump 16, by way of the hose 26.

Figure 10:
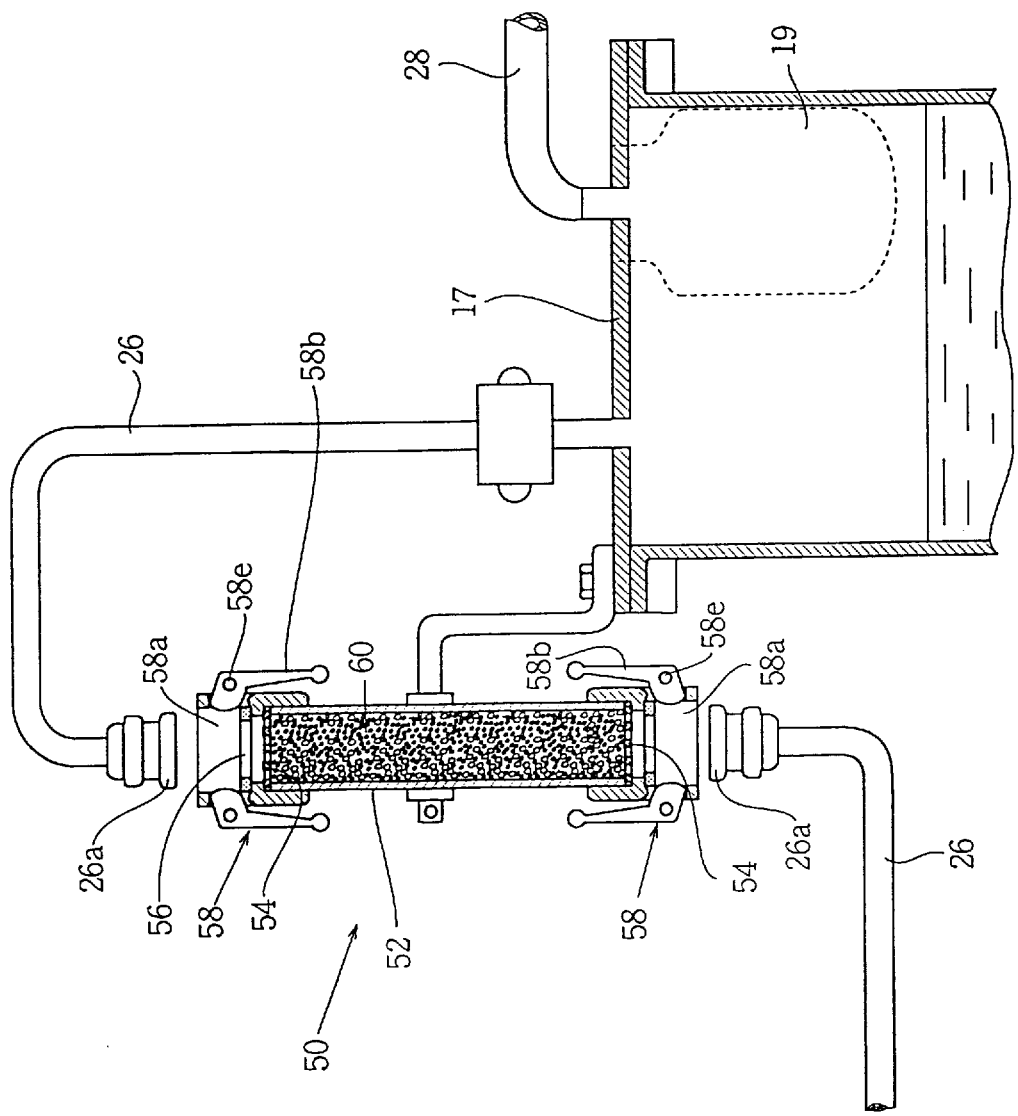
FIG. 10 is an enlarged view illustrating a gas-liquid separation apparatus for use in the suction system of FIG. 9.

Referring to FIG. 10, the gas-liquid separation apparatus 50 comprises a cylindrical main body 52 made of a transparent material, a mass of liquid absorbing granular porous material 60 received in the cylindrical main body 52, a pair of multi-apertured plates 54 secured on the opposite sides of the cylindrical main body 52 for holding the liquid absorbing material 60, and a pair of attachment mechanisms 58 secured on the opposite ends of the cylindrical main body 52 for easily attaching and detaching the gas-liquid separation apparatus 50 in the suction system.

In detail, the cylindrical main body 52 is made of a transparent polyvinyl chloride material, but it may also be made of other kinds of transparent plastic materials. The liquid absorbing material 60 is a silica gel, but it may also be other kinds of porous material having a similar liquid absorbing ability. Further, each of the attachment mechanisms 58 has a connecting portion 58a, and a pair of clamping levers 58b pivotally attached on the portion 58a by a means of pins 58e. By engaging both the connecting portions 58a with connecting members 26a of the hose 26 and turning each lever 58b for 180°, the gas-liquid separation apparatus 50 can be easily connected between the liquid receiving tank 17 and the suction pump 16, by way of the hose 26.

In suction operation, by operating the suction pump 16, the liquid B is sucked back from inside the pipe 7, so that the liquid blocking pig 6, liquid absorbing material 5, resin transporting pig 4, resin A and lining pig 3 are all moved backwardly. As illustrated in FIG. 9, while the resin plug flow A is being moved back, a resin layer 7a is formed on the internal surface of the pipe 7.

With the use of the gas-liquid separation apparatus 50 which allows the passing of a gas but absorbs a liquid, the liquid component is prevented from entering the suction pump 16, thus avoiding a possible damage to the suction pump.

Figure 11:
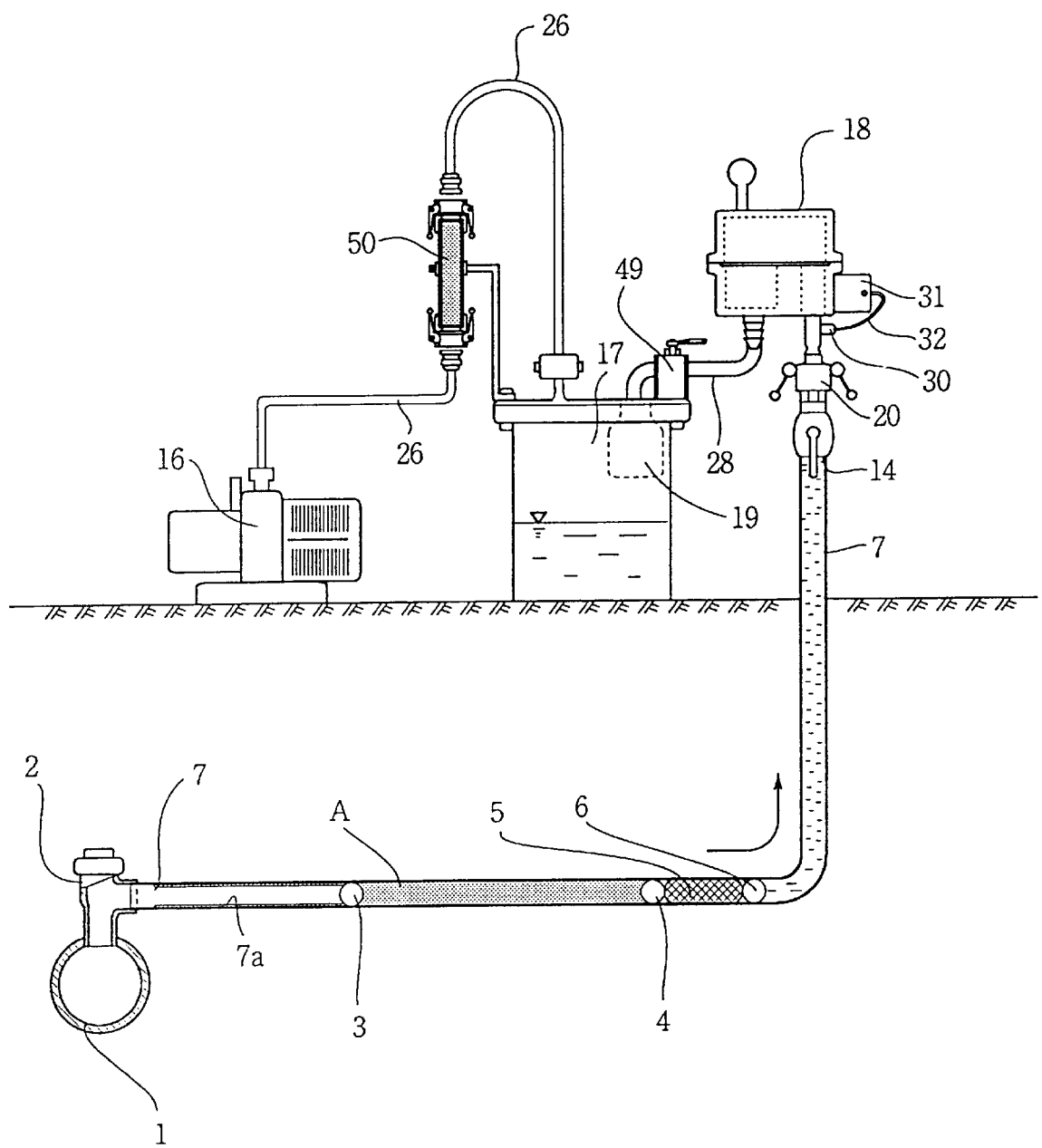
FIG. 11 is an explanatory view illustrating a suction system improved according to the fourth aspect of the present invention, for use in the second step of the method for lining the internal surface of an underground pipe.

FIG. 11 is an explanatory view illustrating a suction system improved according to the fourth aspect of the present invention, for use in the second step of the method for lining the internal surface of an underground pipe. Referring to FIG. 11, the pig receiving device 18 is attached through the connecting mechanism 20 to the open end 14 of the pipe 7 to receive various pigs returning from the pipe 7. The liquid receiving tank 17 is connected through the hose 28 with the pig receiving device 18 to recover liquid B flowing back from the pipe 7. A resin separating means 19, which allows the passing of liquid but stops the resin mixed in the liquid, is provided within the tank 17. The suction pump 16 is connected with the liquid receiving tank 17 through the hose 26.

Further, as shown in FIG. 11, between the open end 14 of the pipe 7 and the pig receiving device 18 is provided the pig detecting device (30, 31, 32) for detecting the passing of a pig returning from the pipe and for giving an alarm signal upon detecting a pig passing. Between the pig receiving device 18 and the liquid receiving tank 17 is provided the suction force controlling device 49 for controlling a suction force caused by the suction pump 16 so as to control a resin lining speed. Between the liquid receiving tank 17 and the suction pump 16 is provided a gas-liquid separation apparatus 50 which allows the passing of a gas but absorbs a liquid so that the liquid component is prevented from entering the suction pump 16.

The operation using the suction system as shown in FIG. 11 is a reasonable combination of the above-described operations using the suction systems improved in accordance with the first, second and third aspects of the present invention, and such operation will thus be easily understood from the above descriptions.

Therefore, with the use of the suction system shown in FIG. 11, it is possible to stop the operation of the suction pump 16 soon after the last pig 3 is detected, so that a possible waste of a gas due to over sucking is exactly prevented. Further, it is possible to obtain two or more kinds of speeds for a fluid flowing in the suction system, thereby effectively controlling the resin lining speed in the pipe 7 so as to form on the pipe internal surface a resin lining layer 7a having a desired thickness. Moreover, liquid component is prevented from entering the suction pump 16, thus avoiding a possible damage to the suction pump.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A suction system for use in a method of lining an internal surface of a pipe, which method including using an injection system to provide a pressurized liquid to introduce a necessary amount of resin into the pipe through an open end thereof and to cause the resin to move forward until a front end of the resin reaches an inner end of the pipe, and using the suction system to provide a suction force to cause the resin to move back from the inner end so as to line the internal surface of the pipe with the resin, said suction system comprising:

a pig receiving device to be attached to an open end of the pipe for receiving from the pipe various pigs used in lining treatment;

a liquid receiving tank connected with the pig receiving device for receiving liquid flowing back from the pipe; and a suction pump connected with the liquid receiving tank for producing a suction force on the liquid, various pigs and the resin introduced in the pipe, to cause the resin to move back from the inner end of the pipe so as to line the internal surface of the pipe with back-moving resin, wherein between the open end of the pipe and the pig receiving device is provided a pig detecting device for detecting the passing of a pig returning from the pipe and for giving an alarm signal upon detecting a pig passing.

2. The suction system according to claim 1, wherein the pig detecting device comprises a detecting section for detecting the passing of a pig, and an alarm means connected with the detecting section for giving said alarm signal upon detecting the passing of a pig.

3. The suction system according to claim 2, wherein the detecting section includes a detecting switch having a push button, and an reversible rubber contact member having an reversible operating portion, said reversible rubber contact member is positioned such that the push button of the detecting switch is covered by the reversible rubber contact member.

4. The suction system according to claim 3, wherein the reversible rubber contact member is positioned such that the push button of the detecting switch is covered by the reversible operating portion of the reversible rubber contact member and that said push button is pushed by said reversible operating portion when it is reversed due to a passing pig.

5. A suction system for use in a method of lining an internal surface of a pipe, which method including using an injection system to provide a pressurized liquid to introduce a necessary amount of resin into the pipe through an open end thereof and to cause the resin to move forward until a front end of the resin reaches an inner end of the pipe, and using the suction system to provide a suction force to cause the resin to move back from the inner end so as to line the internal surface of the pipe with the resin, said suction system comprising:

a pig receiving device to be attached to an open end of the pipe for receiving from the pipe various pigs used in lining treatment;

a liquid receiving tank connected with the pig receiving device for receiving liquid flowing back from the pipe; and a suction pump connected with the liquid receiving tank for producing a suction force on the liquid, various pigs and the resin introduced in the pipe, to cause the resin to move back from the inner end of the pipe so as to line the internal surface of the pipe with back-moving resin, wherein between the pig receiving device and the liquid receiving tank is provided a suction force controlling device for controlling a suction force caused by the suction pump so as to control a resin lining speed and for simultaneously permitting continuous flow therethrough.

6. The suction system according to claim 5, wherein the suction force controlling device is a ball valve which, in its closed position, offers an orifice passage therethrough permitting a flowing communication between an upstream end and a downstream end of the ball valve.

7. The suction system according to claim 6, wherein said orifice passage being changeable in its cross section by providing several valve members having orifice holes of different diameters and changing the valve members in the ball valve.

8. A suction system for use in a method of lining an internal surface of a pipe, which method including using an injection system to provide a pressurized liquid to introduce a necessary amount of resin into the pipe through an open end thereof and to cause the resin to move forward until a front end of the resin reaches an inner end of the pipe, and using the suction system to provide a suction force to cause the resin to move back from the inner end so as to line the internal surface of the pipe with the resin, said suction system comprising:

a pig receiving device to be attached to an open end of the pipe for receiving from the pipe various pigs used in lining treatment;

a liquid receiving tank connected with the pig receiving device for receiving liquid flowing back from the pipe; and a suction pump connected with the liquid receiving tank for producing a suction force on the liquid, various pigs and the resin introduced in the pipe, to cause the resin to move back from the inner end of the pipe so as to line the internal surface of the pipe with back-moving resin, wherein between the liquid receiving tank and the suction pump is provided a gas-liquid separation apparatus which allows the passing of a gas but absorbs liquid so that any liquid is prevented from entering the suction pump.

9. The suction system according to claim 8, wherein the gas-liquid separation apparatus comprises a cylindrical main body made of a transparent material, a mass of liquid absorbing granular porous material received in the cylindrical main body, and a pair of attachment mechanisms provided on the opposite ends of the cylindrical main body for easily attaching and detaching the gas-liquid separation apparatus in the suction system.

10. A suction system for use in a method of lining an internal surface of a pipe, which method including using an injection system to provide a pressurized liquid to introduce a necessary amount of resin into the pipe through an open end thereof and to cause the resin to move forward until a front end of the resin reaches an inner end of the pipe, and using the suction system to provide a suction force to cause the resin to move back from the inner end so as to line the internal surface of the pipe with the resin, said suction system comprising:

a pig receiving device to be attached to an open end of the pipe for receiving from the pipe various pigs used in lining treatment;

a liquid receiving tank connected with the pig receiving device for receiving liquid flowing back from the pipe; and a suction pump connected with the liquid receiving tank for producing a suction force on the liquid, various pigs and the resin introduced in the pipe, to cause the resin to move back from the inner end of the pipe so as to line the internal surface of the pipe with back-moving resin, wherein between the open end of the pipe and the pig receiving device is provided a pig detecting device for detecting the passing of a pig returning from the pipe and for giving an alarm signal upon detecting a pig passing, wherein between the pig receiving device and the liquid receiving tank is provided a suction force controlling device for controlling a suction force caused by the suction pump so as to control a resin lining speed, wherein between the liquid receiving tank and the suction pump is provided a gas-liquid separation apparatus which allows the passing of a gas but absorbs a liquid so that the liquid component is prevented from entering the suction pump.

* * * * *